(12) United States Patent
Drnevich et al.

(10) Patent No.: US 8,318,004 B2
(45) Date of Patent: Nov. 27, 2012

(54) HYDROCARBON TREATMENT METHOD AND APPARATUS

(75) Inventors: Raymond Francis Drnevich, Clarence Center, NY (US); Vasilis Papavassiliou, Williamsville, NY (US); Troy M. Raybold, Colden, NY (US); Perry Raymond Pacouloute, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 785 days.

(21) Appl. No.: 12/535,113

(22) Filed: Aug. 4, 2009

(65) Prior Publication Data

US 2011/0031162 A1 Feb. 10, 2011

(51) Int. Cl.
*C10G 45/04* (2006.01)

(52) U.S. Cl. .......... 208/57; 208/49; 208/91; 208/99; 208/208 R; 208/209; 208/210; 208/211; 208/212; 60/780

(58) Field of Classification Search .......... 60/780; 208/49, 57, 91, 99, 208 R, 209–212
See application file for complete search history.

(56) References Cited

U.S. PATENT DOCUMENTS

| 7,037,485 | B1 | 5/2006 | Drnevich et al. | |
|---|---|---|---|---|
| 2006/0104896 | A1* | 5/2006 | Drnevich et al. | 423/648.1 |
| 2007/0267326 | A1* | 11/2007 | De Almeida et al. | 208/210 |
| 2008/0237090 | A1 | 10/2008 | Musich et al. | |

OTHER PUBLICATIONS

Borowiecki, T. et al. (1997). Applied Catalysis A: General, 153, 141-156.*
Malaibari, Z. (2011). Hydrogen Production from Liquefied Petroleum Gas (LPG) by Oxidative Steam Reforming Over Bimetallic Catalysts, PhD Dissertation, University of Waterloo, 277 pgs.*

* cited by examiner

*Primary Examiner* — Brian McCaig
(74) *Attorney, Agent, or Firm* — David M. Rosenblum

(57) ABSTRACT

A method and apparatus for producing a treated hydrocarbon containing stream for use as a feed to a hydrogen plant having a steam methane reformer in which an untreated hydrocarbon containing stream is introduced into two reaction stages connected in series to hydrogenate olefins and to convert organic sulfur species to hydrogen sulfide. The second of the two stages can also be operated in a pre-reforming mode to generate additional hydrogen through introduction of the oxygen and steam into such stage. A sulfur tolerant catalyst is used in both stages to promote hydrogenation and oxidation reactions. Sulfur is removed between stages by adsorption of the hydrogen sulfide to prevent deactivation of the catalyst in the second of the stages that would otherwise occur during operation of the second reaction stage in a pre-reforming mode of operation.

14 Claims, 1 Drawing Sheet

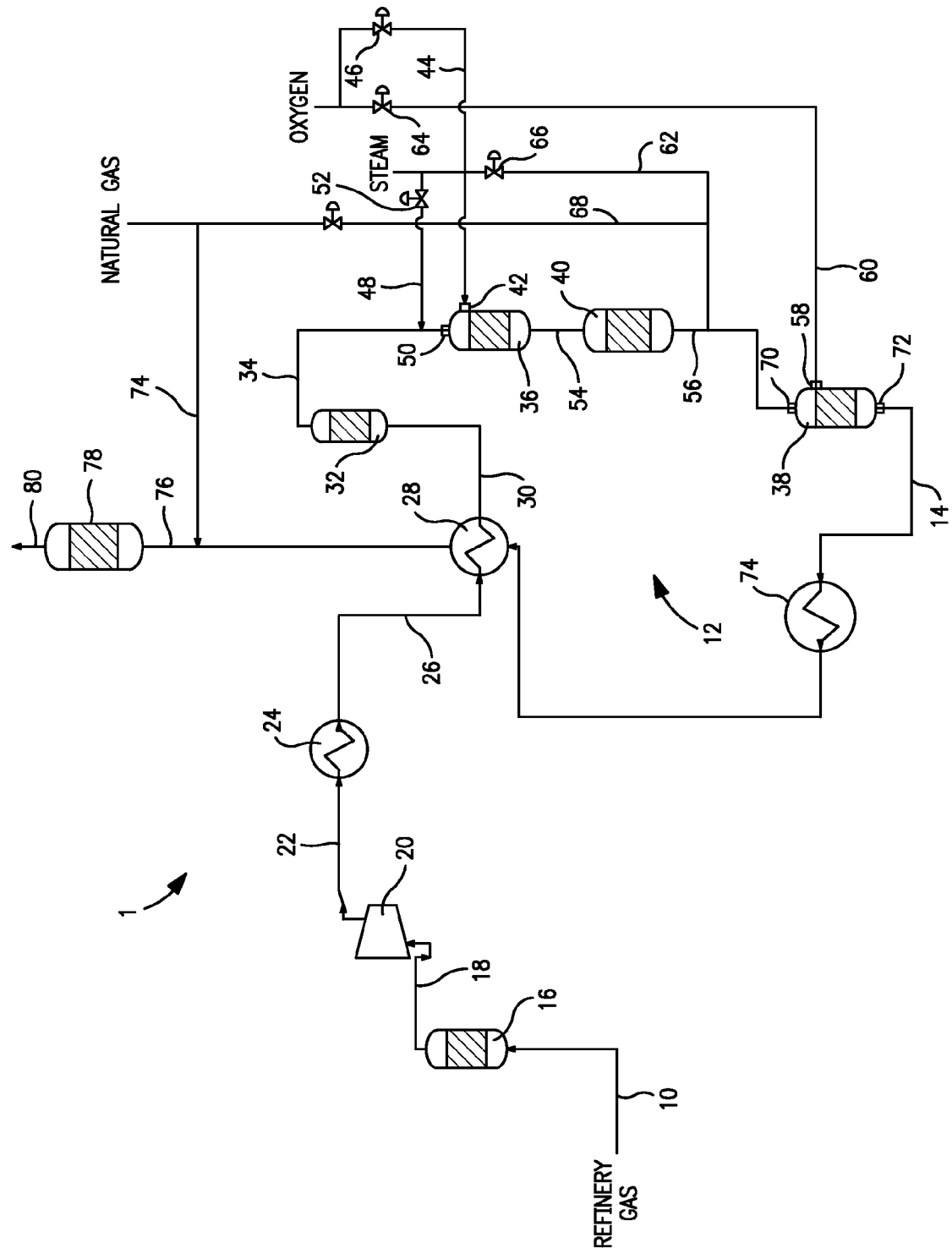

HYDROCARBON TREATMENT METHOD AND APPARATUS

FIELD OF THE INVENTION

The present invention relates to a method and apparatus for treating an untreated hydrocarbon containing feed stream to produce a treated stream to serve as a feed to a steam methane reformer in which the olefin and organic sulfur contained in the untreated hydrocarbon containing feed stream are reduced with the use of a sulfur tolerant catalyst capable of promoting hydrogenation and oxidation reactions. More particularly, the present invention relates to such a method and apparatus in which the sulfur tolerant catalyst is located in two reactors of a reactor system having an adsorbent bed located between the reactors for removal of hydrogen sulfide produced from the conversion of the organic sulfur species in a first of the two reactors.

BACKGROUND OF THE INVENTION

Hydrogen is produced by steam methane reforming of a hydrocarbon containing feed in a steam methane reformer. A hydrocarbon containing stream, typically natural gas, is desulfurized and combined with superheated steam to provide a reactant feed stream. The resulting reactant feed stream is then heated within the convective section of the reformer and then introduced into catalyst packed reformer tubes located in a furnace section of the steam methane reformer. The catalyst is typically nickel. The furnace section has burners that provide heat to support endothermic steam methane reforming reactions in which methane reacts with the steam to produce a synthesis gas containing carbon monoxide and hydrogen. The flue gases produced by the combustion are then routed through a convective section of the steam methane reformer in which heat is recovered for preheating the reactant feed stream and for generating the superheated steam. The synthesis gas is then cooled and passes through one or more water-gas shift reactors in which the carbon monoxide reacts with steam to produce additional hydrogen and carbon dioxide. After further cooling, the hydrogen is separated from the synthesis gas stream by pressure swing adsorption and the resulting tail gas can be used in part to support combustion by the burners in the furnace section of the steam methane reformer.

Although natural gas is a common feed to a steam methane reformer, hydrocarbon streams containing hydrocarbons with more than two carbon atoms can also be processed. Common sources for such hydrocarbon streams include by-product streams of refineries, chemical production facilities and metal producing operations. In many cases these streams have an olefin content. For example, off-gas streams produced in refineries from processes such as fluidic catalytic cracking, coking, catalytic reforming, hydrocracking and etc. have a high hydrocarbon and generally, a moderate hydrogen content. The olefin content of such streams requires pretreatment to avoid carbon deposition on the reforming catalyst that would otherwise result in deactivation of such catalyst. Additionally, such streams have an organic sulfur content that is typically sufficiently high that the sulfur can also present a risk to the catalyst.

U.S. Pat. No. 7,037,485 discloses a steam methane reforming method in which a refinery off-gas alone or a mixture of the refinery off-gas and natural gas is preheated by heat exchange with the synthesis gas stream produced after a high temperature shift reactor and is then introduced into a reactor containing a sulfur tolerant catalyst that is capable of promoting both hydrogenation and oxidation reactions. Such a reactor can be operated in a hydrogenation mode in which hydrogen and the olefins within the feed stream contact the catalyst to hydrogenate the olefins into paraffins and to convert the organic sulfur content of the feed into hydrogen sulfide. The resulting product can then be introduced into a zinc oxide bed to adsorb the hydrogen sulfide and to produce a treated hydrocarbon containing stream that contains no more than about 0.1 ppm by volume of sulfur containing compounds and an olefin content of less than about 0.5 percent of olefins by volume on a dry basis. The reactor can alternatively be operated in an oxidative mode in which steam and oxygen are also introduced into the reactor to produce a stream having a similar reduced olefin and organic sulfur species content, but also, with an increased hydrogen content.

As indicated above, the catalyst used in the '485 patent is "sulfur tolerant". However, this being said, if the refinery gas contains more than 20 ppmv dry organic sulfur species, when the reactor is switched to oxidation mode, the high temperatures and the presence of sulfur will result in the deactivation of the catalyst that will result in a reduction in catalytic activity upon a return to the hydrogenation mode. In this regard, the activity reduction in hydrogenation mode is proportional to the level of oxygen used in the oxidation mode when such sulfur species are present in amounts at and greater than the 20 ppmv level. It is to be noted that certain organic sulfur species that can be present in an off-gas, such as mercaptans, sulfides and thiophenes, are particularly difficult to remove upstream of the reactor. Therefore, such organic sulfur species will invariably be found in the off-gas to be processed.

For example, if a preheat temperature of a refinery off-gas is about 315° C. and the oxygen fed to the reactor is about 4 percent by volume of the refinery off-gas, the catalyst looses approximately 20 percent of activity when subsequently used in the hydrogenation mode when the feed to the reactor is at the 20 ppmv level. If the oxygen is about 6 percent of the refinery off-gas the catalyst looses approximately 50 percent of its activity. If the oxygen is about 8 percent of the refinery off-gas the catalyst is completely deactivated. The deactivation mechanism is not completely understood by the inventors herein, but the presence of sulfur, high temperatures and high hydrocarbon species present in the refinery gas probably combine to form coke that poisons the active catalyst sites. It has also been observed that the presence of organic sulfur in amounts that are greater than about 20 ppmv organic sulfur species in the oxidation mode will reduce reforming activity with less hydrogen produced and less destruction of the olefins.

As will be discussed, among other advantages of the present invention, the present invention provides a method and apparatus that uses such sulfur tolerant catalyst, as described above, utilized in a manner that deactivation of the catalyst can be virtually eliminated. Furthermore, such method and apparatus allows less of such catalyst to be used as compared to the prior art. Other advantages of the present invention will become apparent in the discussion that follows.

SUMMARY OF THE INVENTION

In one aspect, the present invention provides a method of producing a treated hydrocarbon containing stream for use as a feed to a hydrogen plant having a steam methane reformer. In accordance with such method, an untreated hydrocarbon containing stream of variable composition comprising hydrocarbons containing two or more carbon atoms including olefins, organic sulfur species and hydrogen are passed into a reaction system having a first reaction stage, a sulfur removal stage and a second reaction stage connected in series, thereby to produce the treated hydrocarbon containing stream. Each of the first reaction stage and the second reaction stage containing a sulfur tolerant catalyst capable of promoting both hydrogenation reactions in a hydrogenation mode of operation and oxidation reactions in a pre-reforming mode of operation, respectively.

The first reaction stage is operated in the hydrogenation mode of operation such that part of the olefins are hydrogenated into saturated hydrocarbons and at least part of the organic sulfur species are converted to hydrogen sulfide. The hydrogen sulfide is removed in the sulfur removal stage. The second reaction stage is operated in the hydrogenation mode of operation such that a further part of the olefins are hydrogenated into additional saturated hydrocarbons or alternatively, in a pre-reforming mode of operation in which the hydrocarbons are reacted with oxygen and steam such that methane, carbon monoxide and additional hydrogen are produced. In either of the hydrogenation mode of operation or the pre-reforming mode of operation, any further part of the organic sulfur species are converted to additional hydrogen sulfide.

The organic sulfur species are reduced to a sufficiently low level in the first reaction stage and the sufficiently low level of the organic sulfur species coupled with the removal of the hydrogen sulfide in the sulfur removal stage preventing deactivation of the catalyst in the second reaction stage when the second reaction stage is operated in the pre-reforming mode.

The treated hydrocarbon containing stream can be at least part of the feed to a hydrotreater of the hydrogen plant.

The first reaction stage and the second reaction stage can be operated at space velocities in excess of 40,000 hours$^{-1}$. Preferably, both the first reaction stage and the second reaction stage can be operated at a space velocity in excess of about 100,000 hours$^{-1}$. Additionally, in the pre-reforming mode, a natural gas stream can be introduced into the second reaction stage to reduce hydrogen concentration of reactants, thereby to favor and increase production of the additional hydrogen. In any embodiment of the present invention, the hydrogen sulfide can be removed between the first reaction stage and the second reaction stage in a zinc oxide bed.

Where the hydrocarbon containing feed stream is a refinery off-gas stream, the hydrocarbon containing stream can contain between about 5 percent and about 25 percent by volume of olefins on a dry basis. The olefin content is reduced in the first reaction stage to less than about 5 mol percent by volume on a dry basis. The treated hydrocarbon containing stream after the second stage reactor contains less than 2 mol percent of olefins by volume on a dry basis. The sufficiently low level of the organic sulfur species coupled with the removal of the hydrogen sulfide in the sulfur removal stage results in a total sulfur content that is no more than about 20 ppm by volume. As used herein and in the claims, the term, "total sulfur content" means a content of organic sulfur species and hydrogen sulfide.

The treated hydrocarbon containing stream can be passed through a boiler to generate saturated steam for the hydrogen plant and is thereby cooled to a temperature of between about 480° C. and about 590° C. Prior to being introduced into the first reaction stage, the hydrocarbon containing feed stream can be compressed and preheated to a temperature of about 230° C. through indirect heat exchange with steam generated in the hydrogen plant and then, subjected to a pretreatment stage configured to remove metals, chlorides and silica from the hydrocarbon containing feed stream. The stream is thereafter preheated in a feed preheater through indirect heat exchange with the treated hydrocarbon containing stream after passage through the boiler to a temperature of between about 260° C. and about 370° C. The hydrocarbon containing feed stream is passed into the adsorbent at a temperature of no greater than about 450° C. If necessary, prior to the hydrocarbon containing feed stream being compressed, sulfur containing compounds are removed therefrom in a bulk sulfur removal stage.

In another aspect, the present invention provides an apparatus for producing a treated hydrocarbon containing stream for use as a feed to a hydrogen plant having a steam methane reformer. In accordance with this aspect of the present invention, a reactor system is provided that is configured to receive an untreated hydrocarbon containing feed stream of variable composition comprising hydrocarbons containing two or more carbon atoms including olefins, organic sulfur species and hydrogen and to produce the treated hydrocarbon containing stream with an olefin content and an organic sulfur species content that are less than those of the untreated hydrocarbon containing feed stream. The reactor system having a first reactor, a zinc oxide adsorption bed and a second reactor connected in series and the first reactor and the second reactor contain a sulfur tolerant catalyst capable of promoting both hydrogenation and oxidation reactions.

The first reactor is configured to operate in a hydrogenation mode of operation such that part of the olefins are hydrogenated into saturated hydrocarbons and at least part of the organic sulfur species are converted to hydrogen sulfide. The zinc oxide bed is configured to adsorb the hydrogen sulfide produced in the first reactor. The second reactor is configured to operate in the hydrogenation mode of operation such that a further part of the olefins are hydrogenated into additional saturated hydrocarbons or in a pre-reforming mode of operation to react the hydrocarbons with oxygen and steam, thereby to produce methane, carbon monoxide and additional hydrogen. In both of the hydrogenation mode of operation or the pre-reforming mode of operation conducted in the second reactor, most of remaining organic sulfur species are converted to additional hydrogen sulfide. The first reactor is configured to reduce the organic sulfur species content to a sufficiently low level and the adsorption of the hydrogen sulfide in the zinc oxide adsorbent bed thereby prevents deactivation of the catalyst in the second reactor during operation in the pre-reforming mode of operation.

The reactor system has a first inlet for introducing the steam into the second reactor, a second inlet for introducing the oxygen into the second reactor and an outlet for discharging the treated hydrocarbon containing stream from the second reactor. First and second control valves are connected to the first inlet and the second inlet for controlling the operation of the second reactor so that it is able to selectively operate in the hydrogenation mode of operation or the pre-reforming mode of operation.

The second reactor can be in flow communication with a hydrotreater of the hydrogen plant so that the treated hydrocarbon containing stream is at least part of the feed to the hydrotreater.

The reactor system can be provided with a third inlet and third control valve connected to the third inlet and in flow communication with the second reactor. This allows a natural gas stream to be introduced into the second reactor during the pre-reforming mode to reduce hydrogen concentration of reactants within the second reactor and thereby to favor and increase production of the additional hydrogen.

The apparatus can also be provided with a compressor to compress the hydrocarbon containing feed stream. A steam preheater can be connected to the compressor and also the hydrogen plant so that the hydrocarbon containing feed stream is preheated through indirect heat exchange with steam generated in the hydrogen plant. A boiler can be connected to the outlet of the second reactor to generate saturated steam for the hydrogen plant through indirect heat exchange with the treated hydrocarbon containing stream. A feed preheater can be connected to the steam preheater and to the boiler to further preheat the hydrocarbon containing feed stream through indirect heat exchange with the treated hydrocarbon containing stream, thereby to cool the treated hydrocarbon containing stream. A guard bed is connected between the feed preheater and the first reactor and configured to remove metals, chlorides and silica from the hydrocarbon containing feed stream. If necessary, a bulk sulfur removal stage can be connected to the compressor to remove sulfur compounds from the hydrocarbon containing feed stream prior to the compression thereof.

BRIEF DESCRIPTION OF THE DRAWING

While the specification concludes with claims distinctly point out the subject matter that Applicants regard as their invention, it is believed that the present invention will be better understood when taken in connection with the accompanying drawing in which the sole FIGURE is a schematic process flow diagram of an apparatus for carrying out a method in accordance with the present invention.

DETAILED DESCRIPTION

With reference to the sole FIGURE, an apparatus 1 is illustrated that receives an untreated hydrocarbon containing feed stream 10 in a reactor system 12 that is designed to produce a treated hydrocarbon containing stream 14 that has a lower concentration of olefins and organic sulfur species than the untreated hydrocarbon containing feed stream 10. The treated hydrocarbon containing stream 14 is used as a feed to a hydrogen plant that is provided with a steam methane reformer that, although not illustrated, is well known in the art and is fully described above.

The untreated hydrocarbon containing feed stream 10 can be a fluidic catalytic cracker ("FCC") off-gas, a sweet refinery gas, coker off-gas or other type of hydrocarbon containing feed gas that contains a high amount of olefins and organic sulfur species. For example, the present invention would have equal applicability to an untreated hydrocarbon containing feed stream that constitutes an off-gas from steel making, chemical waste streams and streams containing by-products of gasification. Such stream can also be a combination of more than one stream that has been treated in an amine system to reduce hydrogen sulfide to low levels and it is then typically referred as sweet refinery gas ("SRG"). Typically, refinery off-gas streams contain at least about 15 percent by volume on a dry basis of hydrocarbons containing two or more carbon atoms and/or at least about 3 percent by volume on a dry basis of olefins. The table provided below illustrates typical makeup of such off-gas streams from the standpoint of their hydrocarbon content.

| | | Gas Composition (mole fraction %) | | |
|---|---|---|---|---|
| | | FCC offgas | Coker offgas | SRG |
| Hydrogen | mol % | 10.8 | 26.97 | 17.2 |
| Methane | mol % | 37.7 | 52.8 | 42.1 |
| Ethylene | mol % | 15.9 | 0.6 | 9.8 |
| Ethane | mol % | 15.5 | 8.9 | 19.55 |
| Propylene | mol % | 2.84 | 0.9 | 3.8 |
| Propane | mol % | 1.65 | 3.8 | 1.2 |
| Isobutane | mol % | 0.68 | 0.5 | 0.5 |
| Butane | mol % | 0.20 | 1.3 | 0.1 |
| 1-Butene | mol % | 0.15 | 0.2 | 0.1 |
| 1,3-Butadiene | mol % | 0.01 | 0.2 | 0.19 |
| Isopentane | mol % | 0.28 | 0.3 | 0.5 |
| Pentane | mol % | 0.84 | 0.4 | 0.06 |
| 1-Pentene | mol % | 0 | 0.1 | 0 |
| Hexane+ | mol % | 0 | 0.9 | 0 |
| Nitrogen | mol % | 9 | 0 | 0 |
| Oxygen | mol % | 0.02 | 0 | 0 |
| Carbon Monoxide | mol % | 2.15 | 2.1 | 3.3 |
| Carbon Dioxide | mol % | 2.28 | 0.03 | 1.6 |
| Total | | 100 | 100 | 100 |

The makeup of these gases can, however, vary with respect to hydrocarbon content and content of organic sulfur species. Although not illustrated in the Table, the total sulfur content of such streams may range from between about 5 ppmv and about 200 ppmv on a dry basis and is typically divided between mercaptans, thiophenes, sulfides and hydrogen sulfide. Such streams must be treated to decrease the olefin content and the total sulfur content such that the reforming catalyst in the steam methane reformer will not be deactivated by carbon and sulfur deposition. A typical specification for a feed to the steam methane reformer is less than about 0.5 mol percent olefins on a dry basis and less than about 0.1 ppmv total sulfur species.

Optionally, as shown in the FIGURE, the untreated hydrocarbon containing stream 10 is introduced into a bulk desulfurization bed 16 that contains a consumable iron oxide adsorbent which removes hydrogen sulfide and some mercaptans at ambient temperatures. Such beds are well known in the art. Thereafter, the untreated hydrocarbon containing feed stream 10 as a stream 18 is compressed in a compressor 20, if not available at a pressure suitable for flow within apparatus 1. As known in the art, the bulk desulfurization bed 16 could be positioned downstream of the compressor 20. If the particular untreated hydrocarbon containing feed stream 10 did not have an appreciable sulfur content, then bulk desulfurization bed 16 could be eliminated.

The resulting compressed untreated, hydrocarbon containing stream 22 is introduced into a steam heater 24 for purposes of preheating the compressed untreated, hydrocarbon containing stream 22 to a temperature of preferably about 230° C. through indirect heat exchange with steam generated in the hydrogen plant. Such preheating is also effective to heat the compressed untreated, hydrocarbon containing stream 22 for startup purposes of the reactor system 12. After being preheated, the preheated untreated, hydrocarbon containing stream 26 is further heated in a feed preheater 28 through indirect heat exchange with the treated hydrocarbon containing stream 14 to a temperature of between about 260° C. and about 370° C. Thereafter, the further preheated, untreated hydrocarbon containing stream 30 is subjected to a further pretreatment stage in a heavy metal adsorption bed 32 having an alumina adsorbent that removes metals, chlorides and silica from the further preheated, untreated hydrocarbon containing stream 30, thereby to produce a stream 34 that is fed into reactor system 12. Again, if the content of metallic compounds, chlorides and silica were not present, such heavy metal adsorption bed 32 could be deleted.

The reactor system 12 has a first reactor 36, a second reactor 38 and a zinc oxide adsorption bed 40 that are connected in series. The first reactor 36 and the second reactor 38 contain a catalyst capable of promoting both hydrogenation and oxidative reactions and as will be discussed, are capable of operating in hydrogenation and pre-reforming modes of operation. It has been found that while catalysts that are capable of such dual mode operation are sulfur tolerant, as indicated above, there exists a level of organic sulfur that will cause deactivation of the catalyst when operated in the pre-reforming mode in which oxygen is added. The inventors have found that such level, for known catalysts, is an organic sulfur content that is more than 20 ppmv on a dry basis. Consequently, the first reactor 36 is operated in a hydrogenation mode to convert part of such content to saturated hydrocarbons and the organic sulfur content that will invariably remain in the untreated hydrocarbon containing feed stream 10 into hydrogen sulfide. The second reactor 38 can operate in either the hydrogenation mode or the pre-reforming mode in which oxygen and steam is added. When operated in the hydrogenation mode, the remaining olefins or olefin slip from the first reactor 36 will be converted into saturated hydrocarbons in the second reactor 38. When the second reactor 38 is operated in the pre-reforming mode, steam and oxygen are added in sufficient quantities that methane, hydrogen and carbon monoxide are formed from the hydrocarbon content being reacted that contain two or more carbon atoms that would also include the olefins. Oxygen reactions with the available hydrogen and the hydrocarbons produce high temperatures. Depending on the amount of oxygen introduced, saturated hydrocarbons might be produced at low concentrations. At higher oxygen levels, the saturated hydrocarbon would decrease due to predominating reforming reactions produced by the higher temperature. While not wishing to be held to any specific theory of operation and while obviously many different classes of chemical reactions will occur in reactor 38, it is believed that the hydrocarbons with more than two carbon atoms, at least in part, hydrocrack and form hydrocarbons with fewer carbon atoms due to high temperatures that are generated. Other possible mechanisms include the hydrogenation of the olefins. Further, the methane will react with steam to form hydrogen, carbon monoxide, carbon dioxide and water in reforming and water-gas shift reactions. The remaining organic sulfur species content will be concurrently converted to hydrogen sulfide. Typically, then, the pre-reforming mode will be carried out in the second reactor 38 when it is desired that the hydrogen plant produce more hydrogen. Additionally, it will also be carried out when the hydrocarbon containing feed stream 10 does not contain sufficient hydrogen to support hydrogenation reactions in the second reactor 38. However, in such case, product hydrogen can be added to untreated hydrocarbon containing feed stream 10 for such purposes and anywhere prior to its introduction into the first reactor 36. It is to be further noted that the pre-reforming mode will invariably treat longer chain saturated hydrocarbons that would invariably present a risk of carbon formation on the reforming catalyst in the steam methane reformer. However, while this may be inherent in the pre-reforming mode of operation it is an optional advantage of the present invention given that alkalized nickel catalysts have been employed in steam methane reformers that are resistant to deactivation under the presence of such long chain alkanes.

Since, at least to a great extent, the organic sulfur species within the hydrocarbon containing feed stream 10 have been converted to hydrogen sulfide in the first reactor 36 and the same will be adsorbed in the zinc oxide adsorbent bed 40, the catalyst in the second reactor 38 will never be exposed to high concentrations of sulfur containing compounds that would deactivate the catalyst when the hydrogenation mode was again utilized within the second reactor 38. Furthermore, the total amount of catalyst that is required for the first reactor 36 and the second reactor 38 can be reduced as compared with that required if a single reactor were used. The reason for this is that olefin slip from the first reactor 36 to the second reactor 38 is being tolerated and as such catalyst requirements in the first reactor 36 are reduced. With respect to the second reactor 38, since the amount of sulfur containing compounds has been reduced by provision of the first reactor 36 and the adsorption of the hydrogen sulfide in the adsorbent bed 40, hydrogenation reactions in the second reactor 38 will occur at a faster rate. The oxidation reactions in the second reactor 38 during the pre-reforming mode of operation will in any event occur at a sufficiently high rate than the amount of catalyst required in the second reactor 38 will also be reduced. As a result of the foregoing, overall, the amount of required catalyst will be less than that had a single reactor been used for such operations as have been described herein.

Given the lower requirement for the catalyst, the first reactor 36 is operated as a guard bed and since complete conversion of the olefins does not take place within the first reactor 36, typically, first reactor 36 and second reactor 38 can be operated at a high space velocity, namely, above 40,000 hours$^{-1}$. It is to be noted that the amount of catalyst will be proportional to the flow divided by the space velocity and given the increase catalytic activity, preferably, first reactor 36 and the second reactor 38 can be designed to each be operated with a space velocity above 100,000 hours$^{-1}$. As such, either more feed can be handled or for a given installation in connection with a steam methane reformer, less catalyst is required. This is an important consideration given the fact that the catalyst used is a precious metal catalyst that contributes to the fabrication costs of the reactors as well as operational costs when such catalyst is to be replaced.

The catalyst is preferably a metallic monolith coated with a catalytic layer that contains platinum, rhodium, palladium, nickel or ruthenium. The structure of the monolith can be reticulated foam, honeycomb or a corrugated foil wound in a spiral configuration. Catalyst coated beads or ceramic monoliths in the form of a reticulated foam or honeycomb structure are other possibilities. It is believed that the metallic supported catalyst has better performance than other supported catalyst in that it has better heat conductivity which produces a more uniform temperature profile than other catalyst forms and a lower operating temperature. All of these factors permit the more selective destruction of olefins without converting too much of the paraffins, for instance, ethane, into olefins. A useful catalyst can be obtained from Sud-Chemie of Louisville, Ky., USA, which is in the form of a monolith which is sold as PC-PDX 1 on FeCrAlY.

First reactor 36 is operated in a hydrogenation mode in which the olefins are catalytically reacted with the hydrogen contained in the untreated feed stream 10 to produce saturated hydrocarbons and the organic sulfur species are converted to hydrogen sulfide. As indicated above, some preheating is necessary for purposes of startup. However, if for any reason sufficient preheating is not available, heat can be introduced through catalytic oxidation of part of the feed by introduction of oxygen by means of an inlet 42 to the first reactor 36 connected to a conduit 44. Such oxygen addition is controlled by a control valve 46. Additionally, steam from a steam conduit 48 can be mixed with the incoming feed stream 34 and introduced into another inlet 50 of the first reactor 36. The introduction of such steam is controlled by a control valve 52 and the purpose is two-fold. First, the steam will prevent carbon deposition on the catalyst contained in the first reactor 36 so that the steam to carbon ratio is maintained at and below about 1.0. If necessary the steam will also control the temperatures generated in the first reactor 36 given that exothermic hydrogenation reactions are taking place in such reactor. It is to be noted, however, that the degree to which oxidation reaction take place is simply to raise the temperature of the first reactor 36 to that necessary to activate the catalyst and hence, the hydrogenation mode at which reactor 36 operates can include such slight addition of oxygen to raise reactor temperatures. While the addition of oxygen adds to operational expenses, it may be necessary when preheating is unavailable or for operational scenarios that do not involve the direct integration of the present invention into the hydrogen plant as outlined above.

A first partly treated hydrocarbon containing stream 54 discharged from first reactor 36 that contains a reduced content of the olefins and organic sulfur species due to the hydrogenation reactions and an increased content of saturated hydrocarbons and hydrogen sulfide resulting from such hydrogenation of olefins. Preferably, as indicated above, the total sulfur species content is below 20 ppmv on a dry basis. The first reactor 36 is operated such that the olefin content within first partly treated hydrocarbon containing stream 54 is reduced to less than about 5 mol percent by volume on a dry basis and possibly even a lower amount given that the untreated hydrocarbon containing feed stream 10 will typically contain between about 5 mol percent and about 25 mol percent by volume of olefins on a dry basis.

The first partly treated hydrocarbon containing stream 54 is then introduced into an adsorbent bed containing zinc oxide or other chemisorbent to remove the hydrogen sulfide and thereby to produce a second partly treated hydrocarbon containing stream 56. Alternatively, an amine unit is possible. However, this would not be desirable due to the expense involved in acquiring and operating such a unit as compared with a consumable adsorbent bed. In case of a high olefin content, the first partly treated hydrocarbon containing stream 54 might have too high a temperature for a zinc oxide adsorbent bed, namely over 427° C. In such case a heat exchanger might have to be used to cool such stream in addition to or in place of steam addition.

The second partly treated hydrocarbon containing stream 56 is introduced into the second reactor 38 that is operated either in the hydrogenation mode, discussed above or a pre-reforming mode to produce hydrogen and to further lower the olefin content, the organic sulfur species content and other hydrocarbons with two or more carbon atoms that could destroy the steam methane reforming catalyst. When the pre-reforming mode is desired oxygen is introduced into an oxygen inlet 58 of the second reactor 38 connected to an oxygen line 60. In addition steam is also added through a steam line 62 that is in flow communication with a conduit used in connecting the adsorbent bed 40 to the second reactor 38 to serve as an inlet for the steam. The introduction of the oxygen and the steam is controlled by control valves 64 and 66 connected to the oxygen line 60 and the steam line 62, respectively. When the pre-reforming mode is desired, the control valves 64 and 66 are set in open positions. Although not shown, all or part of the steam could be added to the oxygen entering reactor 38.

In addition to the foregoing, part of the natural gas feed to the steam methane reformer can also be introduced into the second reactor 38 by means of a natural gas line 68 that is connected to the conduit leading from the adsorbent bed 40 to the second reactor 38. The purpose of the introduction of the natural gas is to dilute the hydrogen contained in the second partly treated hydrocarbon containing stream 56 to favor increased production of hydrogen due to reaction kinetics involved in the reforming reactions that take place during operation of the second reactor 38 in the pre-reforming mode of operation. Such connection of the natural gas line 68, thus serves as yet another inlet for the natural gas and the mixture containing the second partly treated hydrocarbon containing stream 56, the oxygen and the steam and optionally natural gas is introduced into the second reactor 38 through an inlet 70 thereof. It is to be noted that the production of additional hydrogen within the second reactor 38 can increase hydrogen production in the hydrogen plant of between about 5 percent and about 25 percent.

The treated hydrocarbon containing stream 14 is discharged from the second reactor 38 through an outlet 72 thereof. In either of such modes of operation of the second reactor 38, the treated hydrocarbon containing stream 14 contains less than 2 mol percent of olefins by volume on a dry basis and preferably less than 0.5 mol percent olefins and less than 0.1 ppmv total sulfur species. A higher olefin and sulfur content can be tolerated where the treated hydrocarbon containing stream 14 is to mixed with natural gas and then fed into a conventional hydrotreater associated with the hydrogen plant.

The treated hydrocarbon containing stream 14 is produced at a high temperature and as such it is preferably cooled to a temperature of between about 480° C. and about 590° C. by preferably passing such stream through a boiler 74 to generate saturated steam for the hydrogen plant. The treated hydrocarbon containing stream 14 is then passed into the feed heater 28 to heat the hydrocarbon containing feed stream 26 as described above.

After passage through the feed preheater, the treated hydrocarbon containing stream 14 could be combined with steam and then introduced into the steam methane reformer. Alternatively, it can be combined with another part of the natural gas stream 74 and then as a combined stream 76, introduced into a hydrotreater 78 of the hydrogen plant to hydrogenate any remaining olefins to paraffins to, typically, less than about 0.5 percent olefins on a dry basis and convert the remaining organic sulfur species content of the combined gas stream to hydrogen sulfide. Although not illustrated, the combined stream 76 after passage through the hydrotreater 78 could then be passed through the zinc oxide adsorbent bed of the hydrogen plant, as a stream 80 to produce a stream containing typically less than 0.1 ppm of total sulfur and the resulting stream could in turn be combined with superheated steam and introduced into the steam methane reformer.

When both first and second reactor 36 and 38 are operated in the hydrogenation mode, the operations thereof can be set by considering the amount of hydrogen in the hydrocarbon containing feed stream 10 that will be necessary to reduce the olefin content to a specific level that meets the feed requirements for the steam methane reformer, or in other words, less than 0.5 percent by volume on a dry basis or perhaps a greater amount when blended with natural gas stream 74. This is a straightforward calculation that can be made upon an analysis of the hydrocarbon containing feed stream 10 by a gas chromatograph to obtain its composition. A known sampling port could be provided in the apparatus illustrated in the FIGURE for such purposes. At the same time, the further preheated, untreated hydrocarbon containing stream 30 must be above 400° C. to insure sufficient catalytic activity in first reactor 36. As to first partly treated hydrocarbon containing stream 54, given the exothermic nature of hydrogenation reaction, if anything, such stream may have to be cooled not only for purposes of operations within second reactor 38, but also the zinc oxide bed 40 as mentioned above. The upper temperature limit for conducting operations in this mode in the first reactor will vary with the feed in that at extremely high temperatures, carbon formation will occur. However, practically, it would not be desirable to conduct such operations at temperatures above 650° C. As such temperature is approached, sufficient heat exists that would be best used for supporting reforming reactions with the addition of steam. Moreover, as such temperature is approached, methane, as opposed to hydrogen, begins to be generated that would in any case increase reforming duty on steam methane reformer.

During operations of second reactor 38 in the pre-reforming mode, at temperatures below about 500° C., little appreciable hydrogen will be produced. Above about 860° C., the catalyst life of any catalyst will be compromised and oxygen cost becomes excessive. The temperature can be adjusted by adjustment of the flow rate of the oxygen stream 60 by control valve 64. At the same time, the amount of additional hydrogen produced can be controlled by fine tuning the oxygen to carbon ratio and the steam to carbon ratio given above. The other considerations involve the feed itself, for example, an untreated hydrocarbon containing feed stream 10 that contains a high content of higher order hydrocarbons and/or olefins can impact the oxygen to carbon and steam to carbon ratio required. In any event, in the present invention and with any feed composition, in the pre-reforming mode of operation, it is intended for hydrogen conversion to occur without predominantly converting the hydrocarbon content of the feed to hydrogen and carbon monoxide such as would be the case in a conventional partial oxidation reactor in which conversion rates of greater than about 75 percent are possible. At the given upper limit of the ratios, set forth above, at the maximum temperature of 860° C., such operation will be insured with any feed or in other words, the higher order hydrocarbon content will substantially be reduced to methane, hydrogen and carbon monoxide. For the specific refinery-off gas streams set forth in Table 1, above, at such upper limit, the olefin content and/or the higher order hydrocarbon content will be adjusted down to the limits of operation for a feed to steam methane reformer 52, namely below about 0.5 percent by volume on a dry basis for the olefins and below about 15 percent by volume on a dry basis of the alkanes not including methane. However, fine tuning of the actual ratios used given a particular composition of untreated hydrocarbon containing feed stream 10, again, determined through gas chromatography, can be set by known chemical reaction calculations to conserve oxygen. Further adjustment can be made by determining the composition of the second partly treated hydrocarbon containing stream 56 by gas chromatography. It is to be pointed out that where the treated hydrocarbon containing stream 14 is blended, the olefin and alkane content of the intermediate product stream 76 may be above the aforesaid limits.

As indicated above, the composition of untreated hydrocarbon containing feed stream 10 can change due to variations in the processes that produce a refinery off-gas in the refinery. Such variations can be monitored and controlled with a gas chromatograph and a calorimeter. The gas chromatograph can monitor composition changes but it has a slow response of 5-10 minutes for analysis of a gas stream that contains hydrocarbons with 1-6 carbon atoms. The calorimeter can measure the heating value of the gas and also it can measure its specific gravity with a densitometer that is typically included with the calorimeter. The calorimeter has a very fast response time of 3-30 seconds. Variations in the untreated hydrocarbon containing feed stream 10 can be monitored with the calorimeter and flow can be adjusted so that the treated hydrocarbon containing stream 14 is consistent with requirements for the feed to the steam methane reformer. If the composition changes, for example, due to a hydrogen spike in the refinery off-gas stream 10, the ensuing drop in calorific value will be detected by the calorimeter and the flow to the reactor system 12 will be increased so that the flow of the synthesis gas to be produced by the steam methane reformer is held consistent with hydrogen production rate. The opposite reaction is expected if the hydrogen content is reduced. In that way the calorimeter can provide instantaneous response to feed composition variations. The actual composition can be measured with the gas chromatograph at longer intervals and further adjustments to the flow to the reactor can be made based on the desired hydrogen output and other hydrogen plant parameters with a model predictive control system.

In addition for stable operation of the catalyst and the hydrogen plant as indicated above, it is desirable to maintain the temperature of both the first partly treated hydrocarbon containing stream 54 and the treated hydrocarbon containing stream 14 within at least a stable temperature range. In the hydrogenation mode, olefin concentration increases will lead to temperature increases. Such temperature increases can be tempered by adding steam to the first reactor 36 when the reactor exit temperature begins to approach 650° C. and controlling such addition by control valve 52 and by adding steam to second reactor 38 and controlling the steam addition by way of control valve 66. The steam has a heat capacity that will reduce temperature excursions by adsorbing some of the heat released by the exothermic reaction. The steam also will participate in endothermic reforming reactions that can help maintain the reactor exit temperature within a specific operating window. Too much steam added to the first reactor 36 is undesirable because it constrains the ability of the zinc oxide adsorbent bed 40 to reduce sulfur below 0.1 ppm. In the pre-reforming mode of second reactor 38, both oxygen and steam are added. The amount of oxygen added depends on the desired hydrogen production increase and typically the need to control olefins below 0.5 percent at the entrance of the reformer. The amount of oxygen, steam, flow rate and composition of the untreated hydrocarbon containing stream 10 and the temperature at the inlet to the second reactor 38 determines the reactor exit temperature. For a desired hydrogen production increasing the flow of oxygen can be regulated to keep the exit temperature constant. If the exit temperature increases, then oxygen can be reduced to reduce the temperature and if exit temperature decreases oxygen can be increased to maintain the exit temperature in a narrow range typically with 10 to 20 degrees. Maintaining the exit temperature constant also has the benefit of regulating the composition of the treated hydrocarbon containing stream 14 to ensure it has a more uniform composition and therefore, the steam methane reformer to operate at a stable firing duty and stable hydrogen production capacity.

Although the present invention has been described with reference to preferred embodiments, as would occur to those skilled in the art, numerous changes, additions and omission can be made without departing from the spirit and scope of the invention as set forth in the appended claims.

We claim:

1. A method of producing a treated hydrocarbon containing stream for use as a feed to a hydrogen plant having a steam methane reformer, said method comprising:

passing an untreated hydrocarbon containing stream of variable composition comprising hydrocarbons containing two or more carbon atoms including olefins, organic sulfur species and hydrogen into a reaction system having a first reaction stage, a sulfur removal stage and a second reaction stage connected in series, thereby to produce the treated hydrocarbon containing stream, each of the first reaction stage and the second reaction stage containing a sulfur tolerant catalyst capable of promoting both hydrogenation reactions in a hydrogenation mode of operation and oxidation reactions in a pre-reforming mode of operation, respectively;

operating the first reaction stage in the hydrogenation mode of operation such that a part of the olefins are hydrogenated into saturated hydrocarbons and at least part of the organic sulfur species are converted to hydrogen sulfide;

removing the hydrogen sulfide in the sulfur removal stage;

operating the second reaction stage in the hydrogenation mode of operation such that a further part of the olefins are hydrogenated into additional saturated hydrocarbons or alternatively, operating the second reaction stage in the pre-reforming mode of operation and reacting the hydrocarbons with oxygen and steam such that methane, carbon monoxide and additional hydrogen are produced and in either of the hydrogenation mode of operation or the pre-reforming mode of operation, any further part of the organic sulfur species are converted to form additional hydrogen sulfide; and the organic sulfur species being reduced to a sufficiently low level in the first reaction stage and the sufficiently low level of the organic sulfur species coupled with the removal of the hydrogen sulfide in the sulfur removal stage preventing deactivation of the catalyst in the second reaction stage when the second reaction stage is operated in the pre-reforming mode.

2. The method of claim 1, wherein the treated hydrocarbon containing stream is discharged from the second reaction stage into a hydrotreater of the hydrogen plant.

3. The method of claim 1, wherein the first reaction stage and the second reaction stage are operated at space velocities in excess of 40,000 hours$^{-1}$.

4. The method of claim 1 wherein first reaction stage and the second reaction stage are each operated at a space velocity in excess of about 100,000 hours$^{-1}$.

5. The method of claim 1 wherein, in the pre-reforming mode, a natural gas stream is introduced into the second reaction stage to reduce hydrogen concentration of reactants, thereby to favor and increase production of the additional hydrogen.

6. The method of claim 3 or claim 4 or claim 5, wherein the hydrogen sulfide is removed between the first reaction stage and the second reaction stage in a zinc oxide bed.

7. The method of claim 6, wherein:
the untreated hydrocarbon containing stream is a refinery off-gas stream;
the untreated hydrocarbon containing stream contains between about 5 mol percent and about 25 mol percent by volume of olefins on a dry basis;
the olefin content in the first reaction stage is reduced to less than about 5 mol percent by volume on a dry basis;
the treated hydrocarbon containing stream contains less than 2 mol percent of olefins by volume on a dry basis; and
the sufficiently low level of the organic sulfur species coupled with the removal of the hydrogen sulfide in the sulfur removal stage results in a total sulfur content that is no more than about 20 ppm by volume.

8. The method of claim 7, wherein:
prior to the untreated hydrocarbon containing feed stream being introduced into the first reaction stage, the untreated hydrocarbon containing stream is: compressed and preheated to a temperature of about 230° C. through indirect heat exchange with steam generated in the hydrogen plant; preheated in a feed preheater, through indirect heat exchange with the treated hydrocarbon containing stream, to a temperature of between about 260° C. and about 370° C.; and is subjected to a pretreatment stage configured to remove metals, chlorides and silica from the untreated hydrocarbon containing feed stream; and
prior to the treated hydrocarbon containing stream being passed into the feed preheater, the treated hydrocarbon containing stream is passed through a boiler to generate saturated steam for the hydrogen plant and is thereby cooled to a temperature of between about 480° C. and about 590° C.; and
the first reaction stage is operated such that the hydrogen sulfide is removed in the sulfur removal stage at a temperature of no greater than about 450° C.

9. The method of claim 8, wherein prior to the hydrocarbon containing feed stream being compressed, sulfur containing compounds are removed therefrom in a bulk sulfur removal stage.

10. An apparatus for producing a treated hydrocarbon containing stream for use as a feed to a hydrogen plant having a steam methane reformer, said apparatus comprising:
a reactor system configured to receive an untreated hydrocarbon containing feed stream of variable composition comprising hydrocarbons containing two or more carbon atoms including olefins, organic sulfur species and hydrogen and to produce the treated hydrocarbon containing stream with an olefin content and an organic sulfur species content that are less than those of the untreated hydrocarbon containing feed stream;
the reactor system having a first reactor, a zinc oxide adsorption bed and a second reactor connected in series, the first reactor and the second reactor containing a sulfur tolerant catalyst capable of promoting both hydrogenation and oxidation reactions;
the first reactor configured to operate in a hydrogenation mode of operation such that part of the olefins are hydrogenated into saturated hydrocarbons and at least part of the organic sulfur species are converted to hydrogen sulfide;
the zinc oxide bed configured to adsorb the hydrogen sulfide produced in the first reactor; and
the second reactor configured to operate in the hydrogenation mode of operation such that a further part of the olefins are hydrogenated into additional saturated hydrocarbons or in a pre-reforming mode of operation to react the hydrocarbons with oxygen and steam, thereby to produce methane, carbon monoxide and additional hydrogen and in both of the hydrogenation mode of operation or the pre-reforming mode of operation, any remaining organic sulfur species are converted to additional hydrogen sulfide;
the first reactor configured to reduce the organic sulfur species content to a sufficiently low level and the adsorption of the hydrogen sulfide in the zinc oxide adsorbent bed thereby preventing deactivation of the catalyst in the second reactor during operation in the pre-reforming mode of operation; and the reactor system having a first inlet in fluid communication with steam for introducing said steam into the second reactor, a second inlet in fluid communication with oxygen for introducing said oxygen into the second reactor, an outlet for discharging the treated hydrocarbon containing stream from the second reactor and first and second control valves connected to the first inlet and the second inlet for controlling the operation of the second reactor so that it is able to selectively operate in the hydrogenation mode of operation and the pre-reforming mode of operation.

11. The apparatus of claim 10 wherein the outlet of the reactor system is in flow communication with a hydrotreater of the hydrogen plant so that the treated hydrocarbon containing stream is discharged from the second reactor to the hydrotreater.

12. The apparatus of claim 10 wherein the reactor system has a third inlet and third control valve connected to the third inlet and in flow communication with the second reactor to allow a natural gas stream to be introduced into the second reactor during the pre-reforming mode to reduce hydrogen concentration of reactants within the second reactor and thereby to favor and increase production of the additional hydrogen.

13. The apparatus of claim 10, further comprising:
a compressor to compress the hydrocarbon containing feed stream;
a steam preheater of the hydrogen plant that is connected to the compressor so that the hydrocarbon containing feed stream is preheated through indirect heat exchange with steam generated in the hydrogen plant;
a boiler connected to the outlet of the second reactor to generate saturated steam for the hydrogen plant through indirect heat exchange with the treated hydrocarbon containing stream;
a feed preheater connected to the steam preheater and to the boiler to further preheat the hydrocarbon containing feed stream through indirect heat exchange with the treated hydrocarbon containing stream, thereby to cool the treated hydrocarbon containing stream; and
a guard bed connected between the feed preheater and the first reactor and configured to remove metals, chlorides and silica from the hydrocarbon containing feed stream.

14. The apparatus of claim 13, further comprising a bulk sulfur removal stage connected to the compressor to remove sulfur compounds from the hydrocarbon containing feed stream prior to the compression thereof.

\* \* \* \* \*